(12) United States Patent
Schmitt et al.

(10) Patent No.: US 8,940,833 B2
(45) Date of Patent: Jan. 27, 2015

(54) POLYESTER-BASED, PRESSURE SENSITIVE ADHESIVE

(71) Applicant: Brady Worldwide, Inc., Milwaukee, WI (US)

(72) Inventors: Andrew L. Schmitt, Shorewood, WI (US); Adam Welander, Brown Deer, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 13/833,228

(22) Filed: Mar. 15, 2013

(65) Prior Publication Data

US 2014/0275379 A1 Sep. 18, 2014

(51) Int. Cl.
| | |
|---|---|
| C08G 73/00 | (2006.01) |
| C09J 167/03 | (2006.01) |
| C09J 7/00 | (2006.01) |
| C09J 167/00 | (2006.01) |

(52) U.S. Cl.
CPC ........ C09J 167/03 (2013.01); C09J 7/00 (2013.01); C09J 167/00 (2013.01)
USPC ......... 524/600; 523/500; 524/308; 428/355 R

(58) Field of Classification Search
None
See application file for complete search history.

(56) References Cited

U.S. PATENT DOCUMENTS

| | | | |
|---|---|---|---|
| 3,378,630 A | 4/1968 | Mendelsohn et al. | |
| 3,772,064 A | 11/1973 | Mendelsohn et al. | |
| 2010/0288431 A1* | 11/2010 | Bossaert et al. | 156/247 |
| 2012/0202058 A1* | 8/2012 | Takahira et al. | 428/355 EN |
| 2012/0301717 A1 | 11/2012 | Takahira et al. | |

FOREIGN PATENT DOCUMENTS

| | | |
|---|---|---|
| EP | 2500392 A1 | 9/2012 |
| JP | S5490341 A | 7/1979 |
| JP | 2010001376 A | 1/2010 |

OTHER PUBLICATIONS

Machine translation of JP 2010001376.

* cited by examiner

*Primary Examiner* — Susannah Chung
*Assistant Examiner* — Robert T Butcher
(74) *Attorney, Agent, or Firm* — Whyte Hirschboeck Dudek S.C.

(57) ABSTRACT

A pressure sensitive adhesive (PSA) comprising:
(A) 50 to 99 weight percent (wt %) of a partially aromatic polyester comprising at least two hydroxyl groups per polymer chain and having a:
(1) Storage modulus of >0.33 Megapascals (MPa) at 23° C.,
(2) Mn of 20,000 to 200,000 grams per mole (g/mol), and
(3) Glass transition (Tg) temperature of −60° C. to 20° C.;
(B) 1 to 40 wt % of at least one of a plasticizer or tackifier; and
(C) 0.1 to 10 wt % of a crosslinker with a functionality of >2.5;
with the provisos that the PSA has a:
(i) Tg of −60° C. to 10° C.;
(ii) Storage modulus of <0.33 MPa at 23° C.;
(iii) Rubbery plateau in excess of its Tg; and
(iv) Melt flow in excess of 70° C.

6 Claims, 1 Drawing Sheet

POLYESTER-BASED, PRESSURE SENSITIVE ADHESIVE

FIELD OF THE INVENTION

This invention relates to polyester-based, pressure sensitive adhesives (PSA).

BACKGROUND OF THE INVENTION

Polyester-based adhesive are known but limited. U.S. Pat. No. 3,378,630 describes a thermosetting adhesive comprising a saturated polyester resin and small amounts of melamine-formaldehyde resin, epoxy resin, flexibilizer and antioxidant. The adhesive can be applied to a fibrous backing to make an adhesive tape useful in electrical insulation applications.

U.S. Pat. No. 3,772,064 also describes a polyester-based thermosetting adhesive. The polyester is derived from a low molecular weight dihydric or trihydric polyol, a difunctional aliphatic acid or its corresponding halide or anhydride and a polyfunctional aromatic acid or its corresponding halide or anhydride. This adhesive also can be applied to a fibrous backing to make an adhesive tape useful in electrical insulation applications.

U.S. Patent Application Publication No. 2012/0202058 describes an adhesive sheet for surface protection comprising a substrate and an adhesive layer. The adhesive comprises (i) polyester containing at least a lactic acid unit, a dibasic acid unit, and a glycol unit, and (ii) a crosslinking agent.

Many of these adhesive compositions claim to be "pressure sensitive," but do not meet the practical definition of being a pressure-sensitive adhesive (PSA) as they do not satisfy the Dahlquist criteria for adhesive stiffness. Instead, these materials are better classified as hot-melt or structural type adhesives. One example of a "pressure-sensitive" adhesive comprising polyester is demonstrated in U.S. Patent Application Publication No. 2012/0301717. The invention of this publication is described as a polyester adhesive comprising aliphatic biodegradable polyester having a low weight average molecular weight (Mw) of $1\times10^3$ to $20\times10^3$ as the main component and a tri- or polyfunctional epoxy compound as a crosslinking agent. Such polyesters do not have the same chemical and mechanical resistance as those of traditional condensation polyesters comprising petroleum-derived, non-degradable aromatic diacids (e.g., terephthalic acid and isophthalic acid) with higher weight average molecular weights (40-400 kDa).

SUMMARY OF THE INVENTION

In one embodiment the invention is an aromatic, non-degradable polyester pressure sensitive adhesive that meets the rigorous property-performance attributes known as the Dahlquist criteria while maintaining extremely good chemical durability associated with partially aromatic polyester compounds.

In one embodiment the invention is a pressure sensitive adhesive (PSA) comprising:
 (A) 50 to 99 weight percent (wt %) of a partially aromatic polyester comprising at least two hydroxyl groups per polymer chain and having a:
  (1) Storage modulus of >0.33 Megapascals (MPa) at 23° C.,
  (2) Number average molecular weight (Mn) of 20,000 to 200,000 grams per mole (g/mol), and
  (3) Glass transition (Tg) temperature of −60° C. to 20° C.;
 (B) 1 to 40 wt % of at least one of a plasticizer or tackifier; and
 (C) 0.1 to 10 wt % of a crosslinker with a functionality of >2.5;
with the provisos that the PSA has a:
 (i) Glass transition temperature (Tg) of −60° C. to 10° C.;
 (ii) Storage modulus of <0.33 MPa at 23° C.;
 (iii) Rubbery plateau in excess of its Tg; and
 (iv) Melt flow in excess of 70° C.

In one embodiment the PSA comprises a plasticizer. In one embodiment the PSA comprises a tackifier. In one embodiment the PSA comprises both a plasticizer and a tackifier.

In one embodiment the PSA comprises a latent crosslinker. In one embodiment the PSA comprises a non-latent crosslinker. In one embodiment the PSA comprises both a latent and a non-latent crosslinker.

DETAILED DESCRIPTION OF THE PREFERRED EMBODIMENT

Definitions

Figure 1:
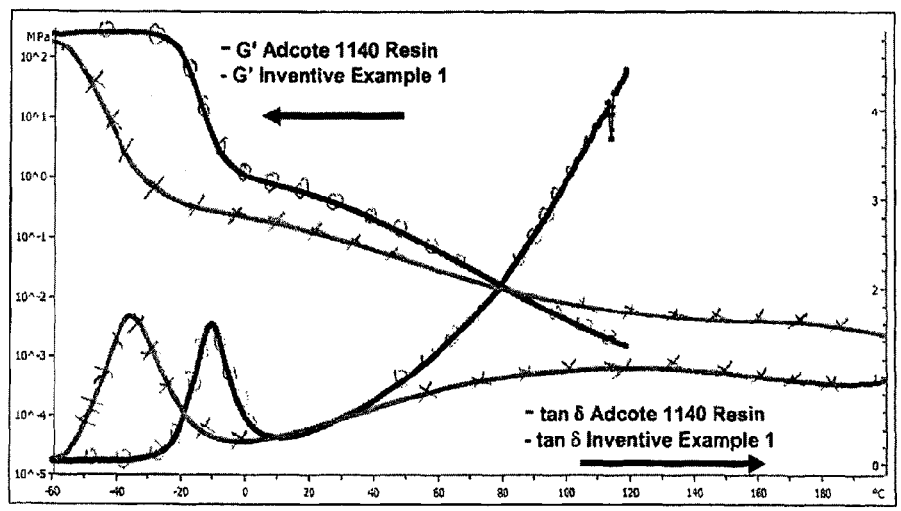
FIG. 1 shows the DMA results for a commercially available polyester "hot melt" adhesive compared to Example 1 at a frequency of 1 Hz.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer or label thickness, is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical values and ranges are provided within this disclosure for, among other things, the relative amounts of the components in the PSA composition, temperature, and the like.

"Dahlquist criteria" means a storage modulus of less than 0.33 MPa at the application temperature (e.g., a temperature in the range from 10° C. to 40° C.) when measured at a frequency of 1 Hz.

A "crosslinker" or crosslinking agent refers to any substance that provides connectivity between polymer chains via covalent, ionic, or coordination chemical bonds.

"Latent crosslinker" and like terms refer to a crosslinking agent that is dormant or unreactive until such time as an external stimuli activates the crosslinking mechanism, typically the formation of chemical bonds. Latent crosslinkers are exemplified by blocked isocyanates. These materials release the blocking group at elevated temperatures that allows crosslinking to proceed in the material.

Polyester

Any polyester comprising at least two hydroxyl groups per polymer chain and having a:

(1) Storage modulus of >0.33 MPa at 23° C.,
(2) Mn of 20,000 to 200,000 g/mol, and
(3) Tg temperature of −60° C. to 20° C.;

can be used in the practice of this invention. Typically the storage modulus is >0.33 MPa and more typically >1.0 MPa. Storage modulus is measure using dynamic mechanical analysis (DMA) under conditions of 23° C. and a frequency of 1 Hertz (Hz). Typically the Mn is of 20,000 to 200,000 g/mol, more typically of 30,000 to 60,000 g/mol. The number-average (Mn) and weight-average (Mw) molecular weight is measured using size exclusion chromatography with triple detection (refractive index, viscosity, and light scattering) to determine the absolute Mn and polydispersity index (Mw/Mn) of resin.

Polyester is well known to those skilled in the art and can include any condensation polymerization products derived by esterification or transesterification of an alcohol and a dicarboxylic acid (including their esters). Alcohols include glycols having 2 to 10 carbon atoms such as ethylene glycol, propylene glycol, butylene glycol, propanediol, methoxypolyalkylene glycol, neopentyl glycol, trimethylene glycol, tetramethylene glycol, hexamethylene glycol, diethylene glycol, polyethylene glycol, cyclohexane dimethanol, and combinations of two or more of these alcohols. Dicarboxylic acids include terephthalic acid, succinic acid, adipic acid, azelaic acid, sebacic acid, glutaric acid, isophthalic acid, 1,10-decanedicarboxylic acid, phthalic acid, dodecanedioic acid, ester-forming equivalent (e.g., diester such as dimethylphthalate), and combinations of two or more of these acids. Frequently used polyesters include polyethylene terephthalate (PET), polypropylene terephthalate, PBT, polyethylene naphthalene, and combinations of two or more of these polyesters. Polyester and the processes for making it are well known to those skilled in the art.

The polyester component of the PSA comprises 50 to 99 wt %, typically 65 to 95 wt %. The polyester component can comprise one or more polyester compounds or resins. In an inventive example, ADCOTE 1140 (available from The Dow Chemical Company) comprises both terephthalic acid and isophthalic acid monomers with a mixture of alkyl glycol diols.

Plasticizer

Any plasticizer compatible with the other components of the PSA can be used in the practice of this invention. As here used, "plasticizer" means one or more compounds that increase the plasticity or fluidity, i.e., flexibility, of a material, particularly a plastic. Various categories of plasticizers include, but are not limited to, a phosphate plasticizer, a phthalate plasticizer, a glycolic acid ester, citric acid ester plasticizer or hydroxyl-functional plasticizer. Examples of the plasticizers in these categories include a phosphate plasticizer such as alkyl glutarate, triphenyl phosphate, tricresyl phosphate, cresyldiphenyl phosphate, octyidiphenyl phosphate, diphenylbiphenyl phosphate, trioctyl phosphate, or tributyl phosphate; a phthalate plasticizer such as diethyl phthalate, dimethoxyethyl phthalate, dimethyl phthalate, dioctyl phthalate, dibutyl phthalate, di-2-ethylhexyl phthalate, butylbenzyl phthalate or dibenzyl phthalate; a glycolic acid ester such as butyl phthalyl butyl glycolate, ethyl phthalyl ethyl glycolate or methyl phthalyl ethyl glycolate; and a citric acid ester plasticizer such as triethyl citrate, tri-n-butyl citrate, acetyltriethyl citrate, acetyl-tri-n-butyl citrate, or acetyl-tri-n-(2-ethylhexyl)citrate. Further examples of plasticizers which may be used in the practice of this invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, arylene-bis(diaryl phosphate), or isophthalates. In another example, the plasticizer comprises diethylene glycol dibenzoate (DEGDB).

In one embodiment, the plasticizer comprises an aliphatic polyester comprising $C_{2-10}$ di-acid residues and $C_{2-10}$ diol residues. Examples of di-acids that provide $C_{2-10}$ di-acid residues include malonic acid, succinic acid, glutaric acid, adipic acid, pimelic acid, suberic acid, azelaic acid, sebacic acid, etc. Examples of diols that provide $C_{2-10}$ diol residues include ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, tetraethylene glycol etc. In another embodiment, the plasticizer is a blend of at least two of the aliphatic polyesters described herein. In another embodiment, the plasticizer is RESOFLEX R296 (Broadview Technologies Inc.) In another embodiment the plasticizer is an aliphatic polyester comprising adipic acid residues and diethylene glycol residues. In another embodiment, the plasticizer is RESOFLEX R804 (Broadview Technologies Inc.). In another embodiment the plasticizer is an aliphatic polyester comprising succinic acid residues and diethylene glycol residues.

Tackifiers

Any tackifier compatible with the other components of the PSA composition can be used in the practice of this invention. As here used, "tackifier" means one or more compounds used in formulating adhesives to increase the tack, i.e., the stickiness of the surface of the adhesive. Examples of tackifying agents that can be used in the practice of this invention include a terpene-based tackifying resin, a phenol-based tackifying resin, a rosin-based tackifying resin, an aliphatic petroleum resin, an aromatic petroleum resin, a copolymer-based petroleum resin, an alicyclic petroleum resin, a xylene resin, an epoxy-based tackifying resin, a polyamide-based tackifying resin, a ketone-based tackifying resin, and an elastomer-based tackifying resin. In particular, a rosin- or terpene-based tackifying resin produced from a plant-derived raw material is preferably used so that the biomass degree can be increased. One of these may be used, or two or more of these may be used in combination.

Examples of the terpene-based tackifying resin include a terpene resin, a terpene phenol resin, and an aromatic modified terpene resin, and specific examples that may be used include an α-pinene polymer, a β-pinene polymer, a dipentene polymer, and their various modifications, such as a phenol-modified terpene-based resin, an aromatic modified terpene-based resin, a hydrogenated modified terpene-based resin, and a hydrocarbon-modified terpene-based resin.

Examples of the phenol-based tackifying resin that may be used include condensation products of formaldehyde and any of various phenols such as phenol, m-cresol, 3,5-xylenol, p-alkylphenol, and resorcin. Further examples that may be used include resols obtained by addition reaction of formaldehyde and any of the phenols in the presence of an alkali catalyst; novolac resins obtained by condensation reaction of formaldehyde and any of the phenols in the presence of an acid catalyst; and rosin-modified phenolic resins obtained by addition reaction of phenol with any of rosins such as unmodified or modified rosin and derivatives thereof and thermal polymerization of the addition product.

Examples of the rosin-based tackifying resin include a rosin resin, a polymerized rosin resin, a hydrogenated rosin resin, a rosin ester resin, a hydrogenated rosin ester resin, and a rosin phenol resin. Specific examples that may be used include unmodified rosin (raw rosin) such as gum rosin, wood rosin, or tall oil rosin, modified rosin obtained by hydrogenation, disproportionation, polymerization, or any other chemical modification thereof, and derivatives thereof.

Amount of Plasticizer and/or Tackifier in the PSA Composition

The PSA composition of this invention requires the presence of one or both of a plasticizer and tackifier. The total amount of plasticizer and tackifier in the PSA composition is typically from 1 to 40 wt %, more typically from 2 to 30 wt % based on the total weight of the composition. The relative amounts of plasticizer and tackifier in the composition can vary to convenience, from 0 wt % plasticizer and 100 wt % tackifier to 100 wt % plasticizer and 0 wt % tackifier. Components typically termed plasticizer and tackifier can have both a plasticizing and tackifying effect on polyester resins.

Crosslinker

The polyester-based PSA composition of this invention also contains a crosslinking agent. A crosslinker or crosslinking agent refers to any substance that provides connectivity between polymer chains via covalent, ionic, or coordination chemical bonds. The crosslinker can be latent or non-latent or it can be a combination of the two. In one embodiment the crosslinking agents include but are not limited to aluminum acetylacetonate, polyvalent isocyanurates, and/or polyfunctional isocyanates that use hydroxyl group functionalities in the polyester chains to form intermolecular bridges. For example, the polyvalent isocyanurate may be a polyisocyanurate of hexamethylene diisocyanate. Commercially available products of the polyvalent isocyanurate may also be used, examples of which include DURANATE TPA-100 (trade name, manufactured by Asahi Kasei Chemicals Corporation) and CORONATE HK, CORONATE HX, and CORONATE 2096 (trade names, manufactured by Nippon Polyurethane Industry Co., Ltd.). One of these may be used, or two or more of these may be used in combination.

Metal centered compounds such as aluminum acetylacetonate can bridge three carboxylic acid groups present in the polyesters through chelation that is activated at temperatures where the acetylacetonate ligand de-bonds and evaporates. This coordination complex has a functionality of 3 and effectively crosslinks the polyester chains to form a network. Metal-based agents include metal acid esters such as aluminum acetylacetonate, chromium acetylacetonate, iron acetylacetonate, cobalt acetylacetonate, nickel acetylacetonate, manganese acetylacetonate, titanium acetylacetonate, zinc acetylacetonate, and zirconium acetylacetonate of combinations thereof.

Polyfunctional isocyanate compounds include, but not limited to, compounds having at least two isocyanate groups, more preferably three or more isocyanate groups in the molecule (when the composition contains a branched polyester oligomer, it may have two or more isocyanate groups), examples of which include aliphatic polyisocyanates, alicyclic polyisocyanates, and aromatic polyisocyanates. One of these may be used, or two or more of these may be used in combination.

Examples of the aliphatic polyisocyanates include 1,2-ethylene diisocyanate, tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; and 2-methyl-1,5-pentane diisocyanate, 3-methyl-1,5-pentane diisocyanate, and lysine diisocyanate.

Examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyl-diphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

The polyfunctional isocyanate compound may also be a dimer or trimer of any of the aliphatic polyisocyanates, alicyclic polyisocyanates, aromatic polyisocyanates, and aromatic aliphatic polyisocyanates, and specifically, the polyfunctional isocyanate compound may be a dimer or trimer of diphenylmethane diisocyanate, a reaction product of trimethylolpropane and tolylene diisocyanate, a reaction product of trimethylolpropane and hexamethylene diisocyanate, or a polymer such as polymethylene, polyphenylisocyanate, polyether polyisocyanate, or polyester polyisocyanate.

Commercially available products of the polyfunctional isocyanate compound may also be used, examples of which include CORONATE L (trade name, manufactured by Nippon Polyurethane Industry Co., Ltd.) as a trimer adduct of trimethylolpropane and tolylene diisocyanate, and CORONATE HL (trade name, manufactured by Nippon Polyurethane Industry Co., Ltd.) as a trimer adduct of trimethylolpropane and hexamethylene diisocyanate.

The crosslinkers described in the preferred embodiment are not restricted to the aforementioned classes; any agent with a functionality of three or greater and that is reactive toward carboxylic acid or hydroxyl groups and chemically compatible (soluble) in polyester resins can be employed in the practice of this invention.

The total amount of crosslinker present in the PSA composition is typically from 0.5 to 10 wt %, more typically from 1 to 6 wt %. The crosslinkers can be used alone or in combinations of two or more. The PSA composition may contain a variety of crosslinking agents (for example, difunctional epoxy compound, polyfunctional melamine compound, polyfunctional oxazoline compound, polyfunctional aziridine compound, metal chelate compound, and blocked or unblocked isocyanates).

Additives

The PSA of this invention may contain ordinary additives such as a UV-absorbent, light stabilizer, release regulator, softener, filler, colorant (pigment, dye, etc.), anti-aging agent, and surfactant, within the range not significantly detracting from the effect of the present invention. These additives are used in known ways and in known amounts within the range not significantly detracting from the effect of the present invention.

Compounding

The PSA can be prepared by sequentially mixing the polyester and crosslinking agent, and optionally a crosslinking catalyst such as aluminum acetylacetonate with MEK or another compatible solvent, followed by the plasticizer and/or tackifier and any additives. Compounding is typically achieved by standard equipment known to those skilled in the art.

PSA

The PSA of this invention is characterized by the following properties:
(i) Tg of −60° C. to 10° C., more typically between −40° C. to 0° C.;
(ii) Storage modulus of <0.33 MPa at 23° C., more typically between 0.01 to 0.33 MPa;
(iii) Rubbery plateau in excess of its Tg; and
(iv) Melt flow in excess of 70° C.

Storage (G') and loss (G") moduli, rubbery plateau region, Tg and melt flow are measured using bending-mode dynamic mechanical analysis using a disk geometry. The measurements are performed with a shear displacement of 25 µM, a frequency of 1 Hz, and a 5° C. ramp rate over the range −60 to 200° C. Tg is measured by finding the peak in tan δ (tan [G"/G']. The rubbery plateau is a temperature-insensitive region observed in the G' curve in the region above Tg that is associated with the application and use window of the PSA. Melt flow behavior begins when tan δ>1.

The PSA of this invention are used in the same manner and amounts as known PSA. These inventive compositions are particularly useful for applications in aerospace, mass transit, automotive, and chemical oil and gas environments where the partially aromatic polyesters imparts extremely good harsh-chemical durability. As an example, the aerospace hydraulic fluid SKYDROL is incompatible with acrylic, natural and synthetic rubbers, polyurethane, styrene-butadiene, neoprene, and butadiene acrylonitrile based pressure sensitive adhesives, and thus disqualifying for use nearly all traditional PSA.

The invention is further illustrated by the following examples.

EXAMPLES

Four formulations are prepared, three inventive formulations containing a plasticizer and a crosslinker within the recommended ranges and one comparative formulation containing no plasticizer or crosslinker. The compositions are reported in Table 1. Samples are prepared by directly adding the appropriate crosslinker (DESMODUR 75, an isocyanate from Bayer, TRIXENE BI 7991 a blocked isocyanate from Baxenden, or aluminum acetylacetonate from Mackenzie) and plasticizer (PLASTHALL 7050 diethyl diether glutarate from Hallstar) quantity to ADCOTE 1140 (from The Dow Chemical Company). ADCOTE 1140 is a 40% solids solution in methyl ethyl ketone (MEK), so the other ingredients can be directly added. This is mixed for 2 hours to produce a clear solution. Samples are cured prior to testing by drawing down solvent-diluted samples on release liners and oven drying for 5 min at 300 F to achieve 0.002" thick films. Samples for probe tack, SAFT, and pull adhesion are laminated to 0.001" polyester facesheets and allowed to dwell for 3 days prior to testing.

TABLE 1

Example Formulations

| Component | Commercial Material | Comparative Example 1 (Wt %) | Inventive Example 1 (Wt %) | Inventive Example 2 (Wt %) | Inventive Example 3 (Wt %) |
|---|---|---|---|---|---|
| Polyester | ADCOTE 1140 | 100 | 73 | 96 | 91 |
| Plasticizer | PLASTHALL 7050 10 | 0 | 21 | 2.5 | 2.5 |
| Crosslinker 1 | DESMODUR 75 | 0 | 2 | 0 | 0 |
| Crosslinker 2 | TRIXENE 7991 | 0 | 4 | 0 | 0 |
| Crosslinker 3 | Aluminum acetylacetonate | 0 | 0 | 1.5 | 6.5 |

The comparison of the rheological performance of the Comparative Example and Inventive Example 1 is reported in FIG. 1. The ADCOTE 1140 polyester resin (Comparative Example 1, the lines with embedded circles) has a storage modulus of about 1 MPa at 23° C. and enters the melt flow region (defined by tan δ>1) at 55° C. Stiffer materials wet out surfaces very slowly building adhesion over impractical pressures and times, additionally, a low melt-flow threshold leads to delamination via cohesive failure and adhesive ooze above the onset temperature, greatly reducing the use window for functional adhesion. In contrast, Inventive Example 1 (FIG. 1, the lines with the embedded X's) is formulated with a plasticizer to soften the material reducing the storage modulus to about 0.3 MPa at 10° C. allowing the adhesive to wet out surfaces much faster (quick stick adhesion). The inventive formula uses a crosslinker that results in a rubbery plateau at all temperatures above the Tg (−24° C.) never entering a melt-flow region over the window between Tg and 200° C.

Figure 2:
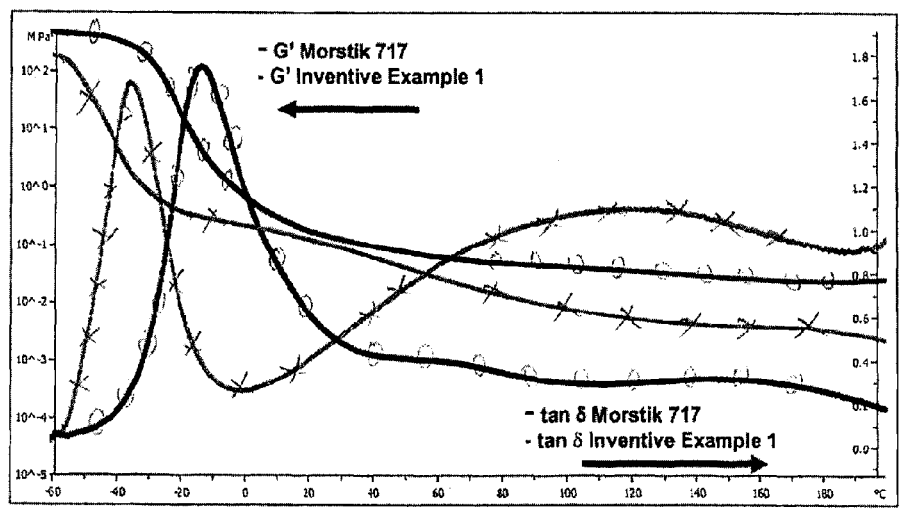
FIG. 2 shows the DMA results for a commercially available acrylic PSA compared to Example 1 at a frequency of 1 Hz.

This prevents cohesive failure and adhesive ooze over a 200° C. use window. For example, in FIG. 2 Inventive Example 1 (the lines with the embedded X's) is compared to a more traditional acrylic PSA (MORSTIK 717, the lines with the embedded circles). The trace with the embedded X's shows that with plasticizing additives, the polyester-based PSA can be even softer than traditional PSA bases, and with the addition of crosslinking additives, large rubbery plateaus can be achieved and the onset of melt flow behavior pushed to very high temperatures.

TABLE 2

Adhesive Properties

|  | Probe tack g | 180 peel (20 min) oz/in | 180 peel (24 h) oz/in | SAFT °C. |
|---|---|---|---|---|
| Comparative Example 1 | 940 | 29 | 37 | 71 |
| Inventive Example 2 | 460 | 20 | 31 | 124 |
| Inventive Example 3 | 440 | 18 | 30 | 167 |

The Dahlquist criteria describe the need of pressure-sensitive adhesives to form good contact with a surface at a bonding frequency of 1/s (1 Hz). This tack, i.e., the amount of energy dissipated via debonding, is measured using a POLYKEN probe tack tester at 1 cm/s displacement and a 1 s dwell time. The probe tester measures the force (in grams) needed to remove a cylindrical plunger with 5 mm diameter from the adhesive surface. Values below 200 g are typical for low/no tack materials where traditional PSA have tack between 400-1500 g. The values for the Comparative sample and Inventive Examples 2 and 3 using a metal chelate crosslinking agent are shown in Table 2. Tack for the inventive samples is in the normal range for PSA, but not as high as the uncrosslinked polyester base resin. Crosslinking constrains the mobility of polymer chains to wet out surfaces. This is overcome in these temperature-resistant formulations (see SAFT below) by offsetting lower tacks with plasticizers and tackifiers that increase the wetting PSA as demonstrated here.

Self-adhesion failure temperature (SAFT) interrogates the high temperature resistance properties of adhesives, namely the ability to avoid cohesive, on internal failure at elevated temperatures. Mechanisms to crosslink PSA are used to prevent adhesive ooze and to provide resistance to internal debonding at elevated temperatures. SAFT is measured using 1 kg loads applied to an area of 1 inch by 0.5 inch on stainless steel panels. The oven is ramped from ambient conditions to 200° C. at 0.5° C./min and the temperature at failure is recorded. As shown by the data in Table 2, the crosslinkers can be successfully employed to push to much higher temperatures the melt flow region associated with cohesive failure at the SAFT point. Using a simple metal chelate as a crosslinker, the SAFT point in the inventive examples can be increased by 50-90° C. into ranges suitable for use in harsh environments where temperature-resistance is required. This crosslinking is, however, offset with additives to offset a decrease tack and adhesion.

Adhesion at room temperature is measured using a 180° geometry using methods known in the art (see, for example ASTM D3330 and ASTM D1000). Short dwell times of 20 minutes reveal the quick stick action of the adhesive; 24 hour dwells indicate full bonding strength at the point of application. Data for the Comparative Example and Inventive Example 2 and 3 are reported in Table 2. Crosslinking dramatically reduces the adhesive strength but this is offset in the inventive examples through the use of a plasticizer to control the rheological behavior of the material. In concert, these formulations show how to take a stiff, chemically resistant, partially aromatic polyester resin to a pressure sensitive adhesive meeting the Dahlquist criteria.

To verify that the polyester in Inventive Example 1 still maintains the chemical-resistance of the original resin, flagging experiments are conducted with 2 mil of Inventive Example 1 coated onto a 1 mil PET film. The film is cut into a 3" by 2" rectangle and wrapped around a size 4 aluminum tube and allowed to dwell for 20 minutes before immersion in the harsh chemical SKYDROL™ hydraulic fluid. After 72 hours of immersion, minimal unwrap is observed consistent with the chemical resistance of the base polyester. Owing to the extremely good harsh-chemical durability of partially aromatic polyesters, the PSA of this invention will be particularly useful for pressures sensitive adhesive applications in environments associated with aerospace, mass transit, automotive, and chemical oil and gas.

It is specifically intended that the present invention not be limited to the embodiments and illustrations contained herein, but include modified forms of those embodiments including portions of the embodiments and combinations of elements of different embodiments as come within the scope of the following claims.

We claim:

1. A pressure sensitive, non-biodegradable adhesive (PSA) comprising:
(A) 50 to 99 weight percent (wt %) of an aromatic polyester comprising at least two hydroxyl groups per polymer chain and selected from the group consisting of polyethylene terephthalate, polypropylene terephthalate, polybutylene terephthalate, polyethylene naphthalene and combinations of two or more of these polyesters, polyesters having a:
(1) Storage modulus of >0.33 Megapascals (MPa) at 23° C.,
(2) Mn of 20,000 to 200,000 grams per mole (g/mol), and
(3) Glass transition (Tg) temperature of −60° C. to 20° C.;
(B) 1 to 40 wt % of at least one of a plasticizer or tackifier; and
(C) 0.1 to 10 wt % of crosslinkers having an average functionality of >2.5;
with the provisos that the PSA has a:
(i) Tg of −60° C. to 10° C.;
(ii) Storage modulus of <0.33 MPa at 23° C.;
(iii) Rubbery plateau in excess of its Tg;
(iv) Melt flow in excess of 70° C.; and
(v) Self-adhesion failure temperature from 124° C. to 167° C.

2. The PSA of claim 1 in which a plasticizer is present.

3. The PSA of claim 1 in which a tackifier is present.

4. The PSA of claim 1 in which both a plasticizer and a tackifier are present.

5. The PSA of claim 1 in which the crosslinker is a non-latent crosslinker.

6. The PSA of claim 1 in which the crosslinker is a latent crosslinker.

* * * * *